(12) United States Patent
Dessaint et al.

(10) Patent No.: US 8,584,899 B2
(45) Date of Patent: Nov. 19, 2013

(54) PLASTIC PREFORM AND SINGLE CONTAINER FOR MAKING A DUAL-CONTAINER DISPENSER

(75) Inventors: Alain Dessaint, Berg Kampenhout (BE); Stefaan De Backer, Kruibeke (BE)

(73) Assignee: La Seda de Barcelona S.A., Barcelona (ES)

( * ) Notice: Subject to any disclaimer, the term of this patent is extended or adjusted under 35 U.S.C. 154(b) by 204 days.

(21) Appl. No.: 12/990,824

(22) PCT Filed: Mar. 23, 2009

(86) PCT No.: PCT/EP2009/002108
§ 371 (c)(1),
(2), (4) Date: Nov. 3, 2010

(87) PCT Pub. No.: WO2009/135566
PCT Pub. Date: Nov. 12, 2009

(65) Prior Publication Data
US 2011/0057054 A1    Mar. 10, 2011

(30) Foreign Application Priority Data

May 9, 2008    (BE) .................... 08008719.0

(51) Int. Cl.
*B05B 9/03*    (2006.01)
(52) U.S. Cl.
USPC ....... 222/129; 215/40; 220/23.83; 222/383.1; 222/545; 239/304
(58) Field of Classification Search
USPC ......... 222/129, 135, 137, 545, 546, 320, 321, 222/321.7–321.9, 372, 373, 378–382, 222/383.1, 383.3, 385; 215/6, 40, 42; 220/23.2, 23.4, 23.83, 4.24–4.27; 239/303, 304, 308
See application file for complete search history.

(56) References Cited

U.S. PATENT DOCUMENTS

| 5,318,203 | A |   | 6/1994 | Iaia et al. |
| 5,386,928 | A |   | 2/1995 | Blette |
| 5,402,916 | A |   | 4/1995 | Nottingham et al. |
| 5,573,143 | A | * | 11/1996 | Deardurff et al. ........ 222/153.14 |
| 5,735,422 | A |   | 4/1998 | Binter |
| 5,823,391 | A |   | 10/1998 | Klauke et al. |
| 7,464,834 | B2 | * | 12/2008 | Law et al. ..................... 222/129 |
| 2008/0000866 | A1 |   | 1/2008 | Yates et al. |

FOREIGN PATENT DOCUMENTS

| EP | 0 761 313 A3 | 3/1998 |
| EP | 1 022 060 A2 | 7/2000 |
| WO | WO 95/05998 A1 | 3/1995 |

* cited by examiner

*Primary Examiner* — J. Casimer Jacyna
(74) *Attorney, Agent, or Firm* — Reinhart Boerner Van Deuren P.C.

(57) ABSTRACT

The rigid plastic container (V) is designed for being assembled with another rigid plastic container (V) and forming a dual-container dispenser. The container (V) comprises a neck finish (2) and a stretched body (3') closed at its bottom end. The neck finish (2) comprises a tubular part (20), an upper wall (21), a lower wall (22) and a side wall (23). The side wall (23) extends between the upper (21) and lower (22) walls and said side wall (23), upper wall (21) and lower wall (22) form a housing (H) for the tubular part (20). The housing (H) comprises an assembly surface (S) formed by the edges of the side wall (23), upper wall (21 and lower wall (22). The tubular part (20) is opened at both ends and forms a path through the upper wall (21), within the housing (H) and through the lower wall (22), for filling the stretched body (31).

20 Claims, 9 Drawing Sheets

PLASTIC PREFORM AND SINGLE CONTAINER FOR MAKING A DUAL-CONTAINER DISPENSER

CROSS-REFERENCE TO RELATED APPLICATIONS

This patent application is the National Stage of International Application No. PCT/EP2009/002108, filed Mar. 23, 2009, that claims the benefit of European Application No. 08008719.0, filed May 9, 2008, the entire teachings and disclosure of which are incorporated herein by reference thereto.

TECHNICAL FIELD

The present invention relates to a novel plastic dual-container dispenser, and more especially to a novel plastic dual-container sprayer.

PRIOR ART

Plastic dual-container dispensers, and more especially dual-container sprayers, are commonly used for simultaneously dispensing two product, in particular liquids that are separately stored in each single container. In particular, such dual-container sprayers comprise a hand-actuated trigger sprayer that is fastened onto a dual-container assembly. This hand-actuated trigger sprayer generally comprises hand-actuated pumping means. This hand-actuated trigger sprayer can comprise two separate spraying nozzles, each nozzle being supplied with the liquid from one container. In another variant, this hand-actuated trigger sprayer can comprise only one spraying nozzle, the liquids in the two containers being mixed prior spraying. Generally, the two containers are made separately by extrusion blow moulding and are then assembled together.

Examples of plastic dual-container sprayers are disclosed notably in U.S. Pat. No. 5,402,916, in European patent application EP 0 761 313 and in PCT patent application WO 95/05998.

The use of extrusion blow-moulding containers enable to achieve only poor sealing properties between the hand-actuated dispensing means and the two neck finishes of the containers, and such dual-container dispensers are thus frequently leaking. There is thus a need for a dual-container dispenser than can be easily and tightly fitted with dispensing means, like spraying means.

SUMMARY OF THE INVENTION

A first object of the invention is thus a plastic preform comprising a neck finish and a tubular body closed at its bottom end, wherein the neck finish a plastic preform comprising a neck finish comprises a tubular part, upper wall, a lower wall and a side wall, wherein said lower wall can be used as a neck-support ring, wherein the side wall extends between the upper and lower walls, and said side wall, upper wall and lower wall form a housing for the tubular part, wherein said housing comprises an assembly surface formed by the edges of the sidewall, upper wall and lower wall, and wherein said tubular part is opened at both ends and forms a path through the upper wall, within the housing and through the lower wall for filling the tubular body.

Such a preform can be easily and advantageously manufactured by injection moulding, and then can be biaxially stretched in a mould, in particular stretch-blow moulded, for forming a single container. In particular, the lower wall of the neck finish can be used for centring and supporting the preform in a mould during the stretch-blow moulding operation. This single container can be easily and precisely assembled with another container of the same type for forming a dual-container assembly.

In addition, the housing formed by the side wall, upper wall and lower wall of the neck finish advantageously enables to make a low weight neck finish, and thus enables to save plastic material.

During the stretch blow moulding process, only the tubular body of the preform is being stretched and can be advantageously moulded in a wide variety of geometries. In return, the neck finish of the preform is advantageously not modified, and the geometry of the neck finish is thus advantageously precisely controlled. The neck finishes of the two containers can thus be efficiently and precisely assembled together.

A further object of the invention is a plastic container obtained by biaxially stretching in a mold the tubular body of the aforesaid preform or a rigid plastic container comprising a neck finish and a stretched body closed at its bottom end, wherein the neck finish comprises a tubular part, an upper wall, a lower wall and a side wall, wherein the side wall extends between the upper and lower walls, and said side wall, upper wall and lower wall form a housing for the tubular part, wherein said housing has a face delimited by the edges of the upper wall, lower wall and sidewall, said edges forming an assembly surface, and wherein said tubular part is opened at both ends and forms a path, through the upper wall, within the housing and through the lower wall. for filling the stretched body.

The upper walls and the side walls of the two neck finishes of the container of the invention can be used for easily and tightly fastening dispensing means, like for example a spraying means, onto the dual-container assembly.

A further object of the invention is a dual-container assembly constituted by the assembly of two aforesaid containers. A further object of the invention is also a dual-container dispenser comprising an assembly of two aforesaid containers and dispensing means that are tightly fastened on the two neck finishes of the containers.

BRIEF DESCRIPTION OF THE DRAWINGS

The technical characteristics and advantages of the invention will appear more clearly on reading the following detailed description which is made by way of non-exhaustive and non-limiting examples, and with reference to the appended drawings, as follows:

FIG. 5 is a top view of the preform of FIG. 1, FIGS. 6 and 7 are side views of a containers obtained by stretch-blow moulding the preform of FIG. 1, FIGS. 8 and 9 are side views of a dual-container sprayer comprising an assembly of two identical containers, like the one shown on FIGS. 6 and 7.

DETAILED DESCRIPTION

Figure 1:
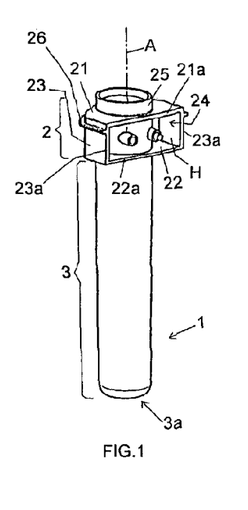
FIG. 1 shows a thermoplastic preform having a neck finish made accordingly to a first variant of the invention.

FIG. 1 shows a thermoplastic preform 1 of the invention a neck finish 2 and a stretchable tubular body 3 closed at its bottom end 3a. The longitudinal axis of the preform 1 is referenced "A" on the drawings.

Directional words such as "upper" "lower", "bottom", "above", "underneath", "horizontal", "vertical" are employed therein by way of description and not limitation with respect to the vertical and upright orientation of the preform or container illustrated in the appended figures.

This preform 1 is manufactured by the well-known technique of injection moulding. Within the scope of the invention, this preform 1 can be a monolayer preform or a multilayer preform. This preform 1 can be made of any known thermoplastic polymer that can be processed by injection moulding in order to form a preform. Polyester polymers, and in particular homo or copolymer of PET, and polyolefin polymers are the most commonly used, but the invention is however not limited to these particular polymers.

This preform 1 is an intermediary product that is subsequently biaxially stretched in a mould in a standard way, in order to form a final container of higher volume, like for example container 1' of FIGS. 6 and 7. This biaxial stretching is for example performed by using the well-known stretch-blow moulding technique (one stage or two stages process). When the preform 1 is biaxially stretched, the neck finish 2 is not modified, and only the tubular body 3 of the preform underneath the neck finish 2 is biaxially stretched. The final container 1' and the preform 1 have thus the same neck finish 2.

Referring to FIGS. 1 to 5, the neck finish 2 comprises a tubular part 20, an upper wall 21, a lower wall 22 and a side wall 23.

Figure 2:
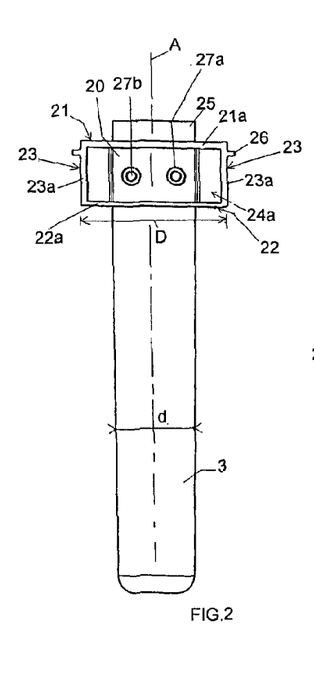
FIG. 2 to 4 are side views of the preform of FIG. 1.

The upper 21 and lower 22 walls are perpendicular to the longitudinal axis (A) of the preform. The transverse dimension D of the lower wall 22 is higher than the diameter d of the tubular body 3 (FIG. 2). This lower wall 22 advantageously forms a neck-support ring that can be used for supporting the preform 1 in a mould during the stretch-blow moulding operation.

Figure 3:
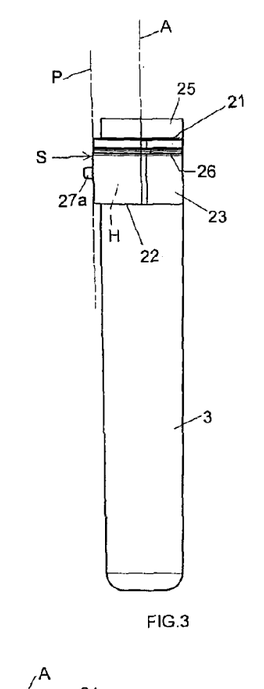
Figure 4:
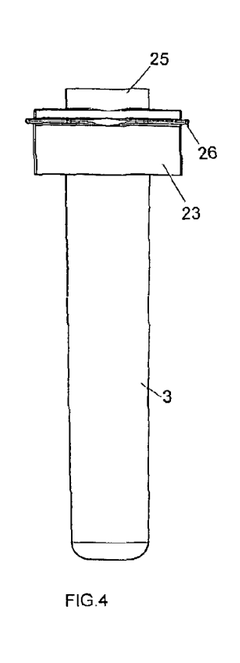
Figure 5:
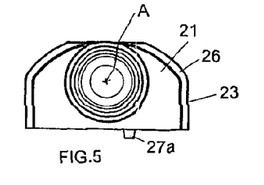

The side wall 23 extends between the upper wall 21 and lower wall 22, and said side wall 23, upper wall 21 and lower wall 22 form a housing H. This housing H surrounds the tubular part 20, and has an open face 24. In particular, this opened face 24 is delimited by the horizontal edge 21a of the upper wall 21, the horizontal edge 22a of the lower wall 22, and the two opposite vertical edge 23a of the side wall 23. Said edges 21a, 22a and 23a are coplanar and form a planar assembly surface S that is substantially parallel to the longitudinal axis A of the preform 1 (FIG. 3—assembly plane P).

In the variant of FIG. 1, an external and peripheral snap rib 26 is formed on the outer surface of the side wall 23 for quickly fastening spraying means onto the neck finish 2.

The tubular part 20 of the neck finish is open at both ends and forms a path through the upper wall 21, within the housing H and through the lower wall 22. This tubular part is used for filling (or emptying) the tubular body 3.

In the particular variant of FIG. 1, this tubular part 20 and the tubular body 3 are cylindrical and aligned with the same central longitudinal axis A. The invention is however not limited to a preform whose tubular part 20 and tubular body 3 are cylindrical; the transverse section of the tubular part 20 and the transverse section of the tubular body 3 can have any kind of geometry. Furthermore, the tubular part 20 can have a different geometry than the tubular body 3. The tubular part 20 is not necessary centred with the tubular body, provided the tubular part 20 constitutes a duct that forms a path through the upper wall 21, within the housing H, and through the lower wall 22, for filling the tubular body 3.

In the particular variant of FIG. 1, the neck finish 2 comprises an external tubular part 25 of small height that is an extension of the tubular part 20, and that is not formed within the housing H but is projecting above the upper wall 21. In another variant of the invention, the neck finish 2 can comprise only the tubular part 20 that is formed within the housing H, with no salient tubular extension 25 above the upper wall 21. In that case the upper opening of the tubular part 20 is formed within the upper wall 21.

Figure 14:
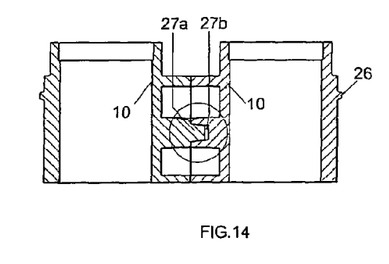
FIG. 14 is a section view of the assembly of FIG. 13, in plane XIV-XIV of FIG. 13.
Figure 15:
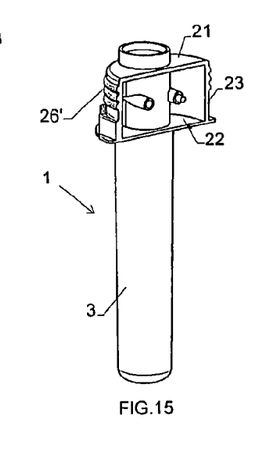
FIG. 15 shows a thermoplastic preform having a neck finish made accordingly to a second variant of the invention.
Figure 16:
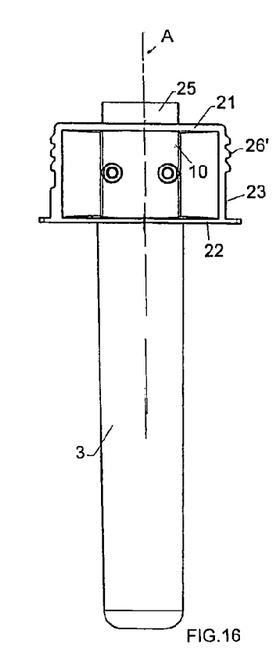
FIG. 16 to 18 are side views of the preform of FIG. 15.
Figure 17:
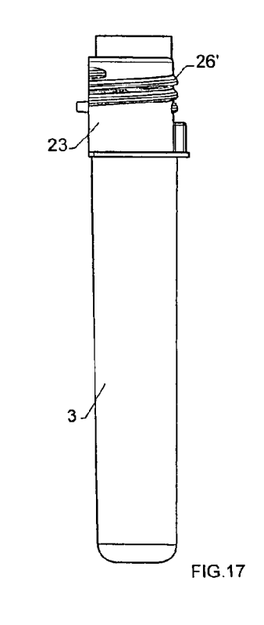
Figure 18:
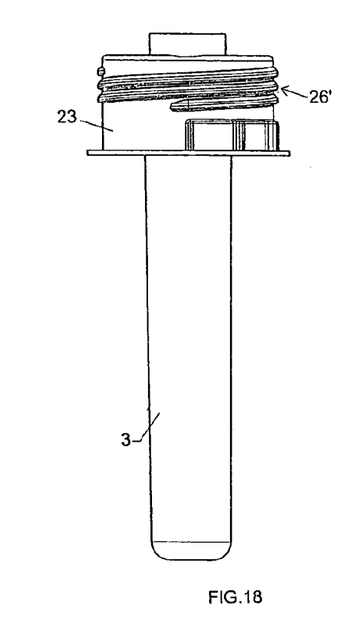
Figure 19:
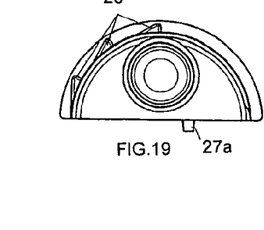
FIG. 19 is a top view of the preform of FIG. 15.

The neck finish 2 further comprises male locking means 27a and female locking means 27b for releasably locking the neck finish 2 with another neck finish 2 comprising the same locking means. In the variant of FIG. 1, the male locking means are constituted by a pin 27a and the female locking means are constituted by a housing 27b. More particularly, the pin 27a and the housing 27b are formed onto the outer surface of the tubular part 20 of the neck finish 2, and the pin 27a projects outside the housing H. More particularly, each pin 27a has a frustum outer surface and each housing 27b has a frustum inner surface, in order to ease the insertion of the pin 27a inside the housing 27b and to improve the locking of the pin 27a within the housing 27b when the neck finishes 2 are assembled together (FIG. 14).

Figure 6:
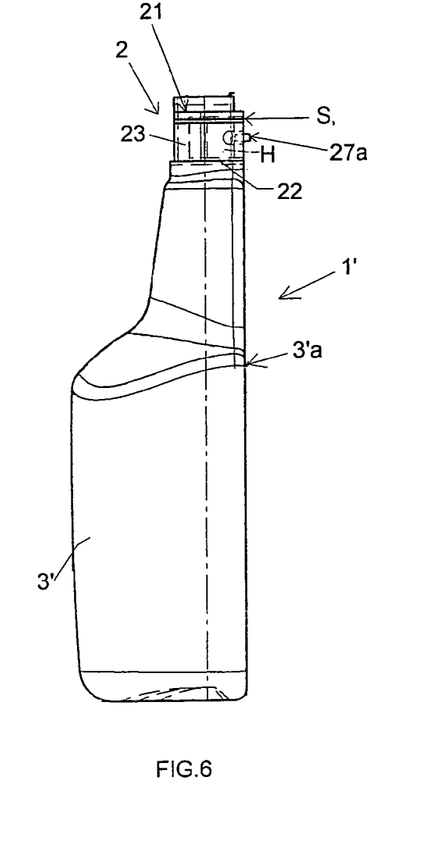
Figure 7:
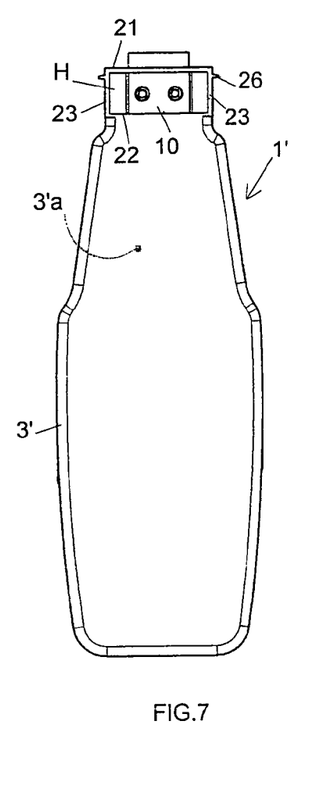

FIGS. 6 and 7 show an example of a single plastic rigid container 1' obtained after stretch-blow moulding the preform 1 into a mould. The tubular body 3 of the preform 1 has been biaxially stretched in order to form a stretched and dissymmetrical body 3'. In the particular embodiment of FIGS. 6 and 7, this stretched body 3' comprises a contacting surface 3'a, that forms a substantially flat vertical wall. The particular moulded shape of this stretched body 3' of the single container illustrated on FIGS. 6 and 7 is not essential for the invention, and is shown only as an example for practising the invention. Other shapes can be contemplated by one skilled in the art for the stretched body 3'. In particular the contacting surface 3'a is not necessary flat, and can have different kinds of geometry, like for example the containers illustrated on FIGS. 22 and 23.

Figure 8:
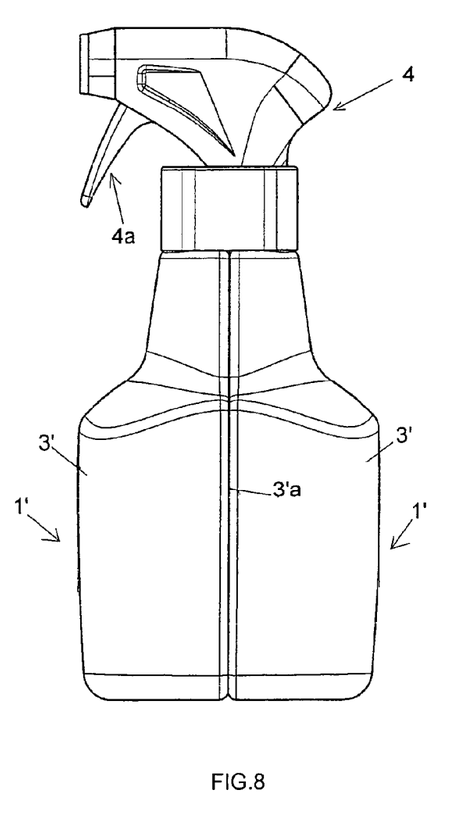
Figure 9:
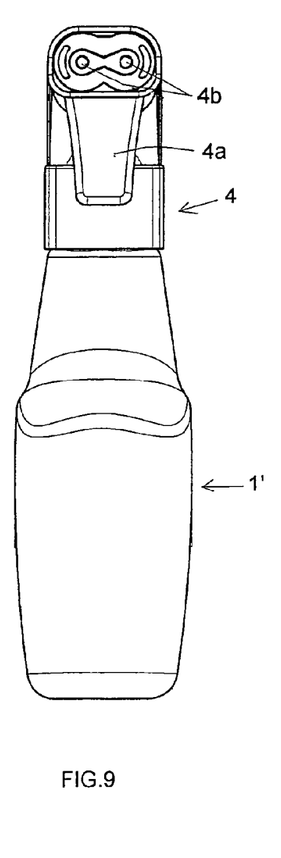
Figure 10:
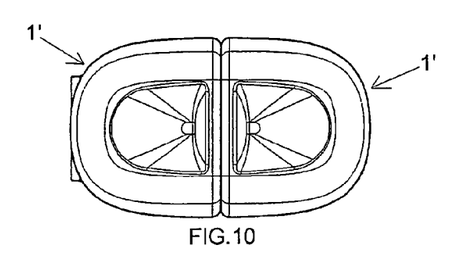
FIG. 10 is a bottom view of the dual-container sprayer of FIG. 8.
Figure 11:
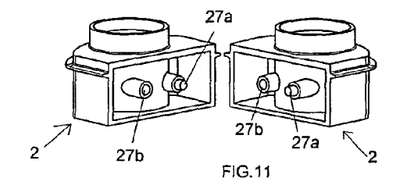
FIG. 11 shows two neck finishes according to first variant, before assembly.
Figure 12:
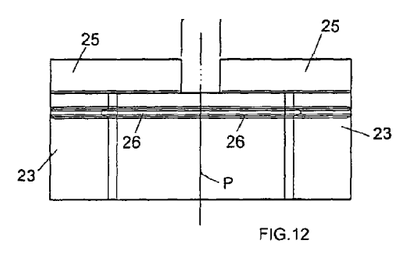
FIG. 12 is a front view of an assembly of the two neck finishes of FIG. 11.
Figure 13:
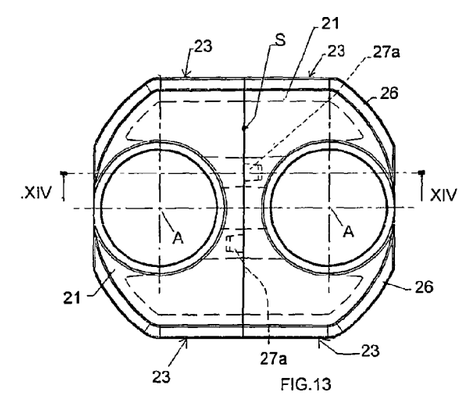
FIG. 13 is a top view of the assembly of FIG. 12.

In reference to FIGS. 8 to 14, two identical single containers 1' can be assembled together in order to form a dual-container assembly. In this assembly, the contacting surfaces 3'a of the stretched body 3' of the containers are in contact; the two neck finishes 2 are positioned against one another and fit together in such a way that their assembly surface S are in contact and the pin 27a of one container fits perfectly within the housing 27b of the other container and vice versa. In the variant of FIGS. 8 and 9, the two containers 1' of the assembly are advantageously identical, which simplify the single containers production and stock control. In another variant however, the two single containers 1' of the dual-container assembly, and in particular the shapes, sizes or colours of the tubular bodies 3', can be different.

Referring to FIGS. 8 and 9, a spraying head 4 (known in the art), comprising a hand-actuated trigger 4a and two spraying nozzles 4b is releasably locked on the two assembled neck finishes 2 of the dual-container assembly, by means of the two complementary snap rib 26 of the containers. The trigger 4a is knowingly used for actuating internal pumping means of the spraying head 4, in order to simultaneously pump and spray the two liquids that are stored in the two containers 1'.

Within the scope of the invention, the spraying head 4 can be replaced by any other dispensing means that can be used for dispensing the products contained in the two single containers 1' of the dual-container assembly. The structure of these dispensing means is not important for practising the invention. Furthermore, a product contained in a single containers 1' is not necessary a liquid, but can be also for example a gas, a gel product or a pasty product.

During the stretch blow moulding process, the neck finish 2 of the preform 1 is advantageously not modified, and the geometry of the neck finish 2 is thus advantageously precisely controlled. The neck finishes 2 of the two containers 1' can thus be efficiently and precisely assembled together. This precise assembling is also enhanced by the locking means 27a, 27b. The two snap ribs 26 are also perfectly aligned. The spraying head 4 can thus be easily fastened on the two assembled neck finishes 2 and can tightly closed the dual-container assembly. Leakage problems are thus avoided.

Figure 20:
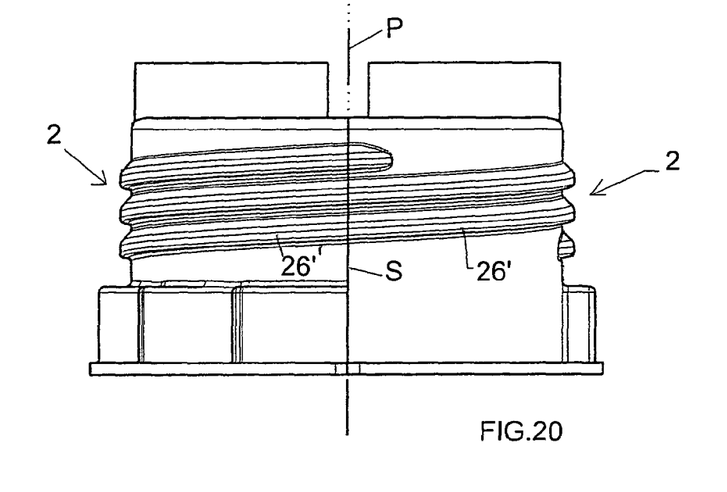
FIG. 20 is a front view of an assembly of the two neck finishes according to the second variant.
Figure 21:
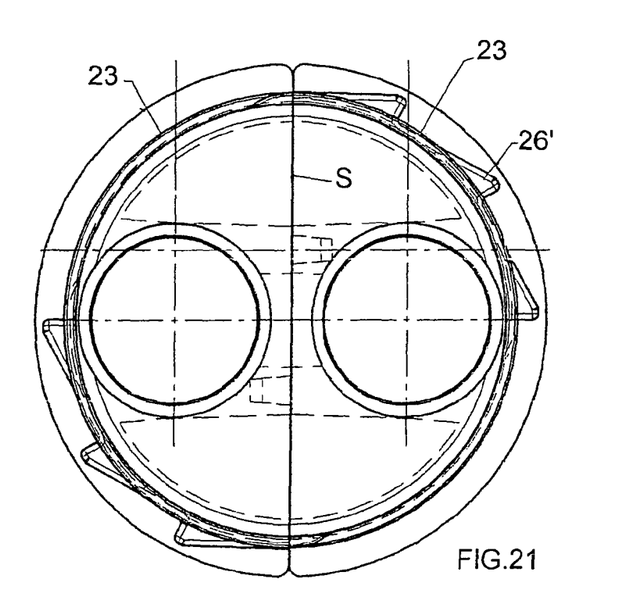
FIG. 21 is a top view of the assembly of FIG. 20, FIGS. 22 and 23 are side views of another variant of dual-container sprayer.

FIGS. 15 to 21 show another variant of a preform 1 of the invention. In this variant, the preform 1 comprises a peripheral threaded portion 26' on the outer surface of the side wall 23, instead of the snap rib 26 of the variant of FIGS. 1 to 5. The shape of the side wall 23 is also hemi-cylindrical. Referring to FIGS. 20 and 21, when the two neck finishes are assembled together, the sidewalls 23 form a cylinder and the two threaded portion 26' form a peripheral thread that can be advantageously used for easily and tightly screwing dispensing means, like for example a spraying head 4, onto the two assembled neck-finishes.

Figure 22:
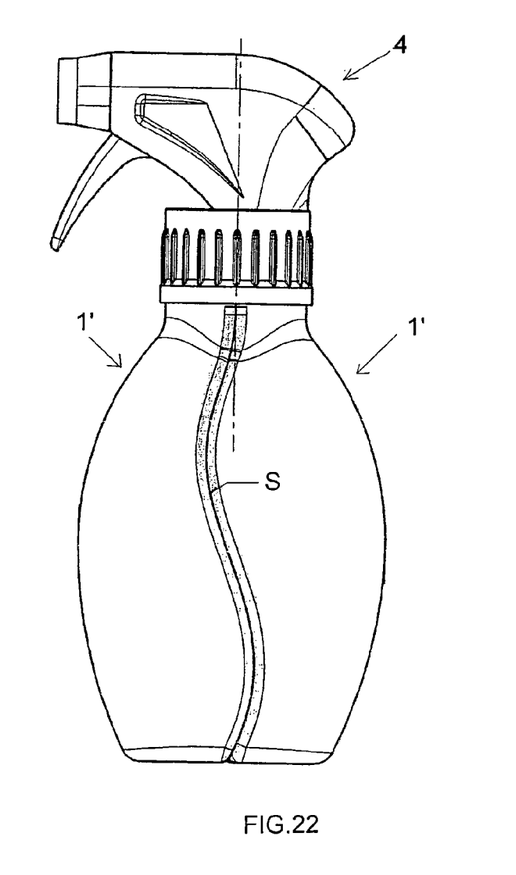
Figure 23:
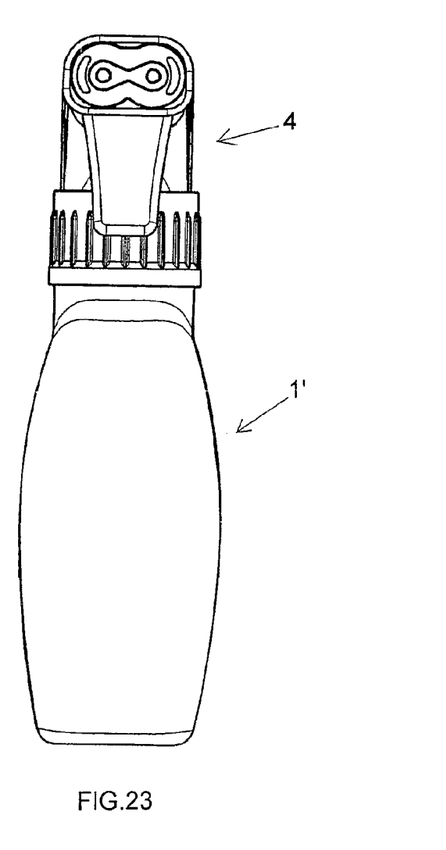
Figure 24:
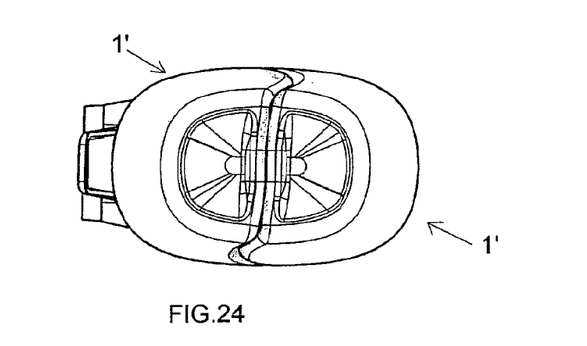
FIG. 24 is a bottom view of the dual-container sprayer of FIG. 22.

FIGS. 22 to 24 show a variant of dual-container dispenser of the invention wherein the contacting surfaces S of the two single containers 1' are not flat but have a curved shape.

Figure 25:
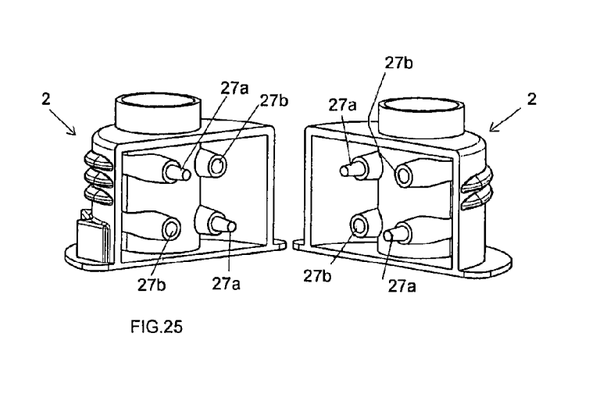
FIG. 25 shows two neck finishes according to a third variant of the invention, before assembly.
Figure 26:
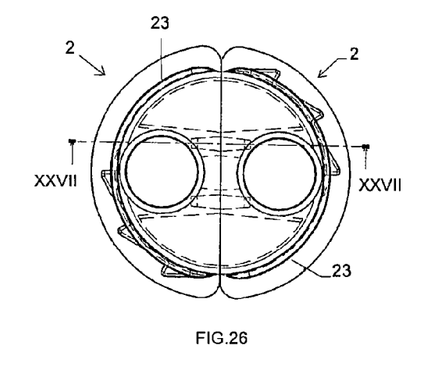
FIG. 26 is a top view of an assembly of the two neck finishes of FIG. 25.
Figure 27:
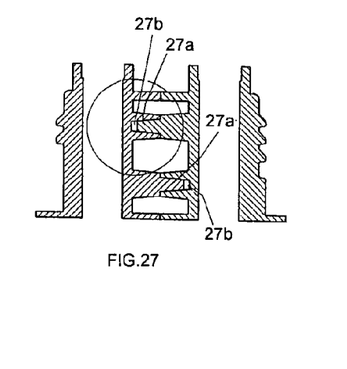
FIG. 27 is a section view of the assembly of FIG. 26, in plane XXVII-XXVII of FIG. 26.

FIGS. 25 to 27 show a variant of the invention wherein the locking means of each neck finish 2 are constituted by two pins 27a and two housing 27b.

Figure 28:
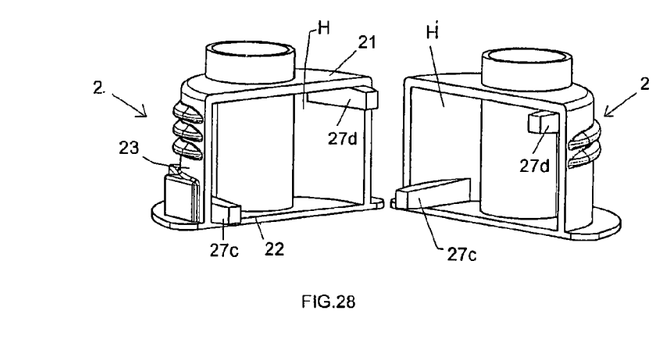
FIG. 28 shows two neck finishes according to a fourth variant of the invention, before assembly.
Figure 29:
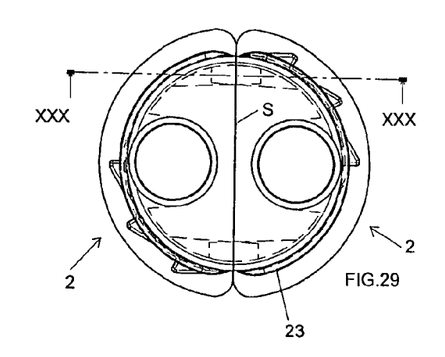
FIG. 29 is a top view of an assembly of the two neck finishes of FIG. 28.
Figure 30:
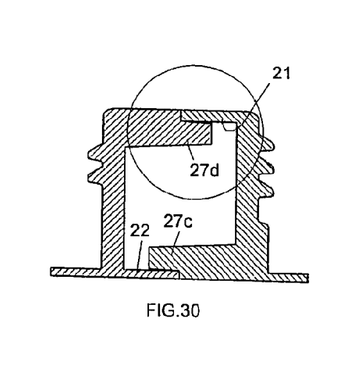
FIG. 30 is a section view of the assembly of FIG. 29, in plane XXX-XXX of FIG. 29

FIGS. 28 to 30 show a variant of the invention wherein the locking means of each neck finish 2 are constituted by two salient locking toes 27c, 27d that project outside the housing H. One lower locking toe 27c is formed between the upper surface of the lower wall 22 and the inner surface of the sidewall 23. The other upper locking toe 27d is formed between the lower surface of the upper wall 22 and the inner surface of the sidewall 23. When the two neck finishes 2 are assembled together, the salient parts of the toes 27c, 27d of each neck finish 2 are introduced in the housing H of the other neck finish 2. The locking of the two neck finishes 2 together is obtained by the lower toe 27c of each neck finish 2 that cooperates with the inner surface of the side wall 23 and with the upper surface of the lower wall 22 of the other neck finish 2, and by the upper toe 27d of each neck finish 2 that cooperates with the inner surface of the side wall 23 and with the lower surface of the upper wall 21 of the other neck finish 2.

The toes 27c, 27d or pin 21a can be replaced by any other equivalent male locking element.

The invention claimed is:

1. A plastic preform comprising a neck finish and a tubular body closed at its bottom end, wherein the neck finish comprises a tubular part, an upper wall, a lower wall and a side wall, wherein said lower wall can be used as a neck-support ring, wherein the side wall extends between the upper and lower walls, and said side wall, upper wall and lower wall form a housing (H) for the tubular part, wherein said housing (H) has a face delimited by the edges of the upper wall, lower wall and side wall, said edges forming an assembly surface, and wherein said tubular part is opened at both ends and forms a path through the upper wall, within the housing (H) and through the lower wall for filling the tubular body.

2. The preform of claim 1, wherein the assembly surface (S) forms an assembly plane (P).

3. The preform of claim 1, further comprising locking means for fastening the neck finish with another neck finish.

4. The preform of claim 3, wherein the locking means are formed on the neck finish.

5. The preform of claim 4, wherein the locking means are formed on the tubular part of the neck finish.

6. The preform of claim 4, wherein the locking means comprise at least one male locking element that projects outside the housing (H) of the neck-finish.

7. The preform of claim 1, wherein a fastener is formed on the outer surface of the side wall.

8. The preform of claim 7, wherein the fastener comprises a peripheral snap rib (26).

9. The preform of claim 7, wherein the fastener comprises a peripheral threaded portion.

10. The preform of claim 1, wherein the outer surface of the side wall is hemi-cylindrical.

11. A plastic container (V), obtained by biaxially stretching in a mould the tubular body of the preform of claim 1.

12. A rigid plastic container (V) comprising a neck finish and a stretched body closed at its bottom end, wherein the neck finish comprises a tubular part, an upper wall, a lower wall and a side wall, wherein the side wall extends between the upper and lower walls, and said side wall, upper wall and lower wall form a housing (H) for the tubular part, wherein said housing (H) has a face delimited by the edges of the upper wall, lower wall and sidewall, said edges forming an assembly surface, and wherein said tubular part is opened at both ends and forms a path, through the upper wall, within the housing (H) and through the lower wall, for filling the stretched body.

13. The plastic container of claim 11, wherein the container forms a dual-container assembly constituted by the assembly of two containers (V).

14. The plastic container of claim 13, wherein the two containers (V) are identical.

15. The plastic container of claim 13, wherein the outer surfaces of the two side walls of the neck finishes form a cylinder.

16. The plastic container of claim 13, wherein a dispensing means tightly fastened on the two neck finishes of the containers.

17. The plastic container of claim 16, wherein the dispensing means are constituted by a hand-actuated sprayer.

18. The plastic preform of claim 2 wherein the assembly plane is substantially parallel to a longitudinal axis of the preform.

19. The container of claim 12 being a rigid stretched blow-mounted container.

20. A rigid plastic container (V) comprising a neck finish and a stretched body closed at its bottom end, wherein the neck finish comprises a tubular part, an upper wall, a lower wall and a side wall, wherein the side wall extends between the upper and lower walls, and said side wall, upper wall and lower wall form a housing (H) for the tubular part, wherein said housing (H) has a face delimited by the edges of the upper wall, lower wall and sidewall, said edges forming an assembly surface, and wherein said tubular part is opened at both ends and forms a path, through the upper wall, within the housing (H) and through the lower wall, for filling the stretched body and wherein the assembly surface (S) forms an assembly plane (P).

* * * * *

UNITED STATES PATENT AND TRADEMARK OFFICE
CERTIFICATE OF CORRECTION

| | | |
|---|---|---|
| PATENT NO. | : 8,584,899 B2 | Page 1 of 1 |
| APPLICATION NO. | : 12/990824 | |
| DATED | : November 19, 2013 | |
| INVENTOR(S) | : Alain Dessaint et al. | |

It is certified that error appears in the above-identified patent and that said Letters Patent is hereby corrected as shown below:

On the title page of the patent under item (30), "Foreign Application Priority Data":

After "May 9, 2008" delete "(BE)" and replace it with --- (EP) ---.

Signed and Sealed this
Second Day of September, 2014

Michelle K. Lee
*Deputy Director of the United States Patent and Trademark Office*